United States Patent Office 2,703,445
Patented Mar. 8, 1955

2,703,445

PROCESS OF MAKING REFRACTORY WARE

John H. Veale, Joliet, Ill., assignor to Illinois Clay Products Company, Joliet, Ill., a corporation of Illinois No Drawing. Application January 9, 1951,
Serial No. 205,222

8 Claims. (Cl. 25—156)

This invention relates to fire brick and other refractories.

The invention concerns the reinforcement of such refractories without impairment of their refractory or other desirable physical qualities. According to the present invention the refractories are superficially reinforced by depositing on their surfaces while in the kiln a minute amount of a fusible refractory material preferably having a fusing temperature above that of the refractory but which is fluxed by the refractory at temperatures below the aforesaid fusing temperature. Among the inexpensive and relatively available materials suitable for this purpose are limestone, lime, dolomite, magnesite and magnesia. Preferably the material is introduced in the kiln and deposited on the refractory by suspending it in powdered form in the air, gas or fuel entering the kiln and passing over the surfaces of the refractory to which refractory a minute amount of the material adheres, particularly when the refractories are at firing temperatures. The material fuses or sinters with the surface of the refractory and thereby reinforces it without impairing the sharpness of the corners and edges of the refractory, or impairing its flat and true surfaces.

The nature and further details of the invention may be readily understood by reference to one illustrative refractory and the method of manufacture hereinafter described.

The invention will be described in connection with the manufacture of clay, silica and basic brick, since such refractories present a plurality of corners and edges which are advantageously reinforced, but it will be understood that the invention applies also to other types and shapes of ceramic and other ware, such as block and tubular shapes. So called basic refractories may be made from magnesium oxide or chromium oxide.

In brick refractories it is important, among other reasons, that they have true surfaces and sharp corners and edges, thereby to expose a minimum joint area to erosion. Broken or chipped corners or edges of the brick expose greater areas to erosion and greater areas of the more vulnerable mortar, if any be used. For example, ordinary silica brick refractories are especially friable at the edges and it is common to have a 15% loss in handling due to broken and chipped edges. In the case of fire clay ladle brick, as another example, large joints or broken corners or edges provide opportunity for penetration of molten metal. Oxidation of the metal expands the joint and causes spalling. Also the penetration and freezing of the molten material which comprises the skull (i. e., the remainder which is too cool to pour) tends to pull loose the brick when the skull is dumped out.

I have discovered that the brick or other refractories may be superficially reinforced while retaining the original sharpness of the edges and corners and without impairing their refractory and other desirable qualities, by fusing in and with the surface layer, corners and edges of the refractory, a minute amount of refractory toughening agent. This should not be confused with a glaze coating such as is placed on ceramic ware, since that would warp and otherwise impair the refractory and destroy the sharpness of the corners and edges.

The amount of toughening material should be limited and controlled, making it all the more important to distribute this minute amount of material uniformly. This is effected in the present instance by introducing the reinforcing agent in the air or other gas, or in the fuel which circulates through the mass of ware in the kiln. It will be understood that in both tunnel and periodic kilns the ware is so stacked as to provide spaces or channels between the pieces of ware for the hot gases.

The point or points of introduction of the reinforcing material into the kiln are not important so long as it comes in contact with or is carried into contact with the ware when it is in such condition (which for want of a better term may be called sticky or tacky) near its firing temperature as to insure adhesion and intimate contact of the reinforcing material with the surface and particularly at the corners and edges where the need for reinforcement is greatest. In periodic kilns the reinforcing material may be introduced into the fire boxes near the end of the cycle and carried by the draft into the kiln. If the reinforcing material be sufficiently refractory, only a very small amount thereof will be held by the sticky or tacky surface of the ware. If less refractory and easily fluxed material were used, more could be made to adhere to the ware.

The reinforcing material is ground quite fine (100 mesh and finer) so that it will readily be carried by the circulating gases at the gas velocities reached inside the kiln. I have found that limestone or dolomite make excellent reinforcing materials. They are cheap and readily available and may be easily ground to the necessary fineness. Calcium and magnesium oxides have a fusion point higher than that of fire clay. Any water insoluble refractory mineral which will flux with the surface of the refractory at temperatures below the fusion point of the refractory may be used as a reinforcing agent. Preferably for acid refractories, a basic reinforcing agent such as lime, magnesium oxide and the like is used. For basic refractories, an acid reinforcing agent such as clay is preferable. This facilitates superficial fluxing of the two materials at temperatures below the fusion temperature of the refractory. Mixtures of various reinforcing agents may be used. If the ware be fired at relatively low temperatures or if it is not intended to be subjected to high temperatures (as is often the case with clay ware) a more readily fluxing reinforcing material may be used, such as sodium chloride, magnesium carbonate or borax. In ordinary kilns, grinding of the reinforcing material to 200 mesh is sufficient to insure its being carried in the air or gas streams inside the kiln. The degree of fineness depends somewhat on the minimum velocity of the gases carrying the material.

The reinforcing material may advantageously be introduced into the kiln (in an oil or gas fired kiln) in the pipes or conduits carrying the air or fuel stream or streams leading to the kiln burners or directly into the kiln. The gas velocity in such pipes or conduits is quite high and insures entrance into the kiln where the gas velocities are lower but nevertheless sufficient to carry the fine reinforcing material to the proper zone in the kiln. Also the material may be introduced at the fans which force secondary air into the kiln or, in the case of tunnel kilns, which produce the counterflow of hot gases in the kiln. However, erosion of fans, etc. is minimized if the material be introduced into the kiln without contacting with expensive auxiliary apparatus. This method of introduction of the reinforcing material makes it possible to limit the amount which combines as an eutectic mixture with the ware to that which is intimately in contact therewith in the surface of the ware and can be fluxed with the clay or other material from which the ware is made. In most cases being in the nature of a superficial eutectic mixture, this occurs at temperatures below the fusing temperatures of the refractory and the reinforcing materials. Only by this method can the amount of reinforcing material and the temperature be limited to reinforcing the material adequately and uniformly and at temperatures which do not impair the sharpness of the edges and corners. With other methods of application, the reinforcing powder is applied either too heavily or not uniformly or requires excessive temperatures for its application.

The amount of reinforcing material fed may vary from ¼ pound to 1½ pounds per 100 square feet of ware surface; that is, from 1 to 6 pounds per 500 fire brick, 3 pounds being preferable. Thus, all of its becomes so intimately associated with the clay or other refractory material as to form a eutectic mixture which fuses or sinters at a temperature below that of the fusing point of the reinforcing material itself, and thus avoids the possibility of warping or deforming the ware, as would be the case if it were necessary to raise the ware to the fusing temperature of the reinforcing material, as in the application of a glaze. The result is the corners and edges of the ware remain sharp and the surfaces true. Even through no coating is formed on the ware, its surface is nevertheless sealed against penetration of metal, as where the refractory is used in a ladle lining.

The resulting ware is thus reinforced against chipping and may be laid up with a minimum of joint area or exposed mortar. The color of the brick is also advantageously more uniform and darker, a quality which enhances its merchantability.

This method may also be used to reinforce ceramic and other ware which is not subject to substantial heat in use, such as sewer pipe and tile. For this and other ware in which preservation of sharp edges and corners is not necessary, a greater amount of easily fluxing reinforcing material such as powdered salt may be introduced and a substantial thickness of reinforcement may be built up.

Obviously the invention is not limited to the details of the illustrative product or its method of manufacture, since these may be variously modified. Moreover, it is not indispensable that all features of the invention be used conjointly, since various features may be used to advantage in different combinations and sub-combinations.

Having described my invention, I claim:

1. The method of reinforcing the corners and edges of refractory ware which comprises placing the ware in a chamber heated to the fusing temperature of the ware, introducing a small amount of refractory material selected from the group consisting of calcium and magnesium oxides into the chamber in suspension in gases entering the chamber, said refractory material being of such fineness as to be carried by the gases into contact with the ware, bringing the material thus supended into contact with the ware while the latter is near its fusing point but below the fusing point of said refractory material, so as to cause the material to adhere to the ware, and maintaining the temperature to cause the material and the surface of the ware to flux together.

2. The method of reinforcing the surface of a clay refractory which comprises firing the refractory, passing into contact with the refractory at its firing temperature hot gases carrying in suspension therein a minute amount of a solid powdered material selected from the group consisting of limestone, lime, dolomite, magnesia and magnesite, the said powered material adhering to the surface of the refractory, and maintaining the firing temperature until the mixture of the said powdered material and the clay and the surface of the refractory sinters.

3. The method of reinforcing the surface of a clay refractory which comprises depositing on the surface of the refractory a powdered material having a higher fusion point than the clay and selected from the group consisting of limestone, lime, dolomite, magnesia and magnesite in such minute quantities that the said powdered material and the clay at the surface of the refractory forms substantially a eutectic mixture which fuses at a temperature lower than the fusing temperature of the powdered material, firing the refractory at temperatures below the fusing temperature of the said powdered material until the said mixture fuses.

4. The method of reinforcing the surface of a clay refractory which comprises firing the refractory at its normal firing temperature and depositing on the surface thereof a powdered material having a higher fusion point than the clay and selected from the group consisting of limestone, lime, dolomite, magnesia and magnesite in such minute quantities that the said powdered material and the clay at the surface of the refractory form substantially a eutectic mixture which fluxes at a temperature not higher than the said normal firing temperature and below the fusing temperature of said powdered material.

5. The method of reinforcing the surface of fired material selected from the group consisting of clay, silica, magnesium oxide and chromium oxide which comprises placing the ware in a chamber, introducing into the chamber in suspension in gases entering the chamber a small amount of refractory reinforcing material ground to such fineness as to be carried in suspension in said gases, said chamber being heated to the fusing temperature of the ware but below the fusing temperature of said material, and carrying said material into contact with the ware in suspension in said gases, and depositing said material on the surface of the ware thereby to result in fluxing of said material with the surface of the ware.

6. The method of reinforcing the corners and edges of refractory ware which comprises placing the ware in a heated chamber, introducing a small amount of refractory material selected from the group consisting of calcium and magnesium oxides into the chamber in suspension in gases entering the chamber, the temperature of the chamber being below the fusion point of said material but being hot enough to cause fluxing of said material with the surface of the ware, said refractory material being of such fineness as to be carried by the gases into contact with the ware and deposited thereby on the surface of the ware for fluxing therewith.

7. The method of reinforcing the surface of a clay refractory which comprises firing the refractory, then while the refractory is at firing temperature carrying into the kiln a powered reinforcing material in suspension in the hot gases entering the kiln, carrying said material into contact wth the refractory while in suspension in said hot gases and depositing the material on the surfaces of the refractory as the gases pass the same, said refractory being fluxed on contact with the powdered reinforcing material at said firing temperature, continuing the firing temperature until said material fluxes in said surface.

8. The method of reinforcing the corners and edges of refractory ware which comprises placing the ware in a heated chamber, introducing into the chamber in suspension in the gases entering the chamber a small amount of solid refractory material powdered to such fineness to be carried with such gases, and depositing the suspended material on the surface of the ware, the temperature in said chamber being high enough to cause fluxing of said material with the surfaces of the ware.

References Cited in the file of this patent

UNITED STATES PATENTS

| | | |
|---|---|---|
| Re. 17,661 | Martin | May 13, 1930 |
| 1,356,211 | Linebarger | Oct. 19, 1920 |
| 1,473,286 | Forse | Nov. 6, 1923 |
| 1,583,902 | Schurecht | May 11, 1926 |
| 1,728,766 | Kraner | Sept. 17, 1929 |
| 1,735,167 | Ivery | Nov. 12, 1929 |
| 1,954,936 | Lampe | Apr. 17, 1934 |